United States Patent [19]
Carroll

[11] Patent Number: 5,436,678
[45] Date of Patent: Jul. 25, 1995

[54] ASPHERIC MULTIFOCAL CONTACT LENS

[75] Inventor: Elizabeth A. Carroll, Clinton, Mass.

[73] Assignee: Wilmington Partners L.P., Wilmington, Mass.

[21] Appl. No.: 129,919

[22] Filed: Sep. 30, 1993

[51] Int. Cl.$^6$ ............................................. G02C 7/04
[52] U.S. Cl. ........................................................ 351/161
[58] Field of Search ............... 351/160 R, 160 H, 161, 351/162

[56] References Cited

U.S. PATENT DOCUMENTS

| | | | |
|---|---|---|---|
| 3,482,906 | 12/1969 | Volk | 351/160 |
| 3,950,082 | 4/1976 | Volk | 351/169 |
| 4,418,991 | 12/1983 | Breger | 351/161 |
| 4,525,043 | 6/1985 | Bronstein | 351/160 |
| 4,765,728 | 8/1988 | Porat | 351/160 |
| 5,050,981 | 9/1991 | Roffman | 351/177 |
| 5,349,395 | 9/1994 | Stoyan | 351/161 |

FOREIGN PATENT DOCUMENTS 0184490  6/1986  European Pat. Off. .
2059102  4/1981  United Kingdom .

*Primary Examiner*—Scott J. Sugarman
*Attorney, Agent, or Firm*—John E. Thomas; Craig E. Larson; Denis A. Polyn

[57] ABSTRACT

Contact lenses, particularly adapted to correct presbyopic vision, having a multiaspheric back surface having a central zone, a marginal zone, and a peripheral zone, each of the zones being constituted by portions of second-order surfaces of revolution other than spherical, wherein the axial edge lift of the central and marginal zones increase toward the edge of the lens, the transition from the central to the marginal zone is tangential, and the axial edge lift of the peripheral zone decreases toward the edge of the lens.

9 Claims, 1 Drawing Sheet

ASPHERIC MULTIFOCAL CONTACT LENS

BACKGROUND OF THE INVENTION

1. Field of the Invention

The present invention relates to multifocal lenses and especially aspheric multifocal lenses used to correct vision in patients having vision defects such as presbyopic vision, accommodative insufficiency, aphakia, or accommodative convergence defects.

2. Background

Existing multifocal lenses can be broadly categorized as either simultaneous or alternating designs. Alternating designs require lens translation to present the eye alternatively with distance and near lens segments. Simultaneous designs do not require lens translation but rather involve focusing both the distance and near images at the same time. Concentric simultaneous designs may have either a circular near segment surrounded by an annular distance segment (center-near) or the reverse (center-far). The optical performance of the concentric simultaneous designs is affected by changes in pupil size and by variations in lens position. The sensitivity to pupil size may affect the relative bias between distance and near, the optimum vergence, and the range of focus.

Aspheric multifocal lenses are a type of concentric simultaneous lens having an increasingly flatter curve from the center to the edge of the lens. This aspheric curve may appear on the posterior (ocular) side of the lens or on the anterior side of the lens, although posterior aspheric designs are the designs of particular interest in considering the present invention. The flattening of the posterior surface on these lenses produces the multifocal power in conjunction with the refractive index difference between the tear film and the lens material.

Good centering is essential if maximum visual acuity is to be achieved with the aspheric multifocals. Centering is enhanced by selecting lens base curves which are much steeper than the curvature of the cornea being fitted. However, while the optical performance of a lens fitted in this way is good, the potential for corneal edema is increased. Accordingly, optimal centering of current posterior aspheric designs must be compromised by fitting the lenses less steeply and by increasing the overall lens size. Due to the steepness with which the lenses are fit, a relatively flat spherical curve is often added to the edge of the posterior surface of the lens to improve tear exchange under the lens.

SUMMARY OF THE INVENTION

The present invention is a contact lens designed to overcome the typical decentering problems associated with aspheric multifocal lenses as well as to minimize the variability in optical quality caused by varying pupil sizes. The lens also minimizes the need for steep fitting relationships and thus minimizes corneal distortion and alleviates the increased edema associated with some posterior aspheric multifocal designs.

The lens of this invention comprises an edge and a back surface having a central zone, a marginal zone, and a peripheral zone, each of the zones being constituted by portions of second-order surfaces of revolution other than spherical, wherein the axial edge lift of the central and marginal zones increase toward the edge of the lens, the transition from the central to the marginal zone is tangential, and the axial edge lift of the peripheral zone decreases toward the edge of the lens. Preferably, the transition between the marginal zone and the peripheral zone is smoothed by an aspheric fillet curve, the fillet curve being constituted by a portion of a second-order surface of revolution other than spherical.

The lens of this invention uses aspheric conic sections to generate posterior surfaces having the flattening which is characteristic of aspheric multifocals but also having edge lifts associated with single-vision, back-surface, aspheric designs. This allows the use of standard front surface designs for the lens.

DETAILED DESCRIPTION OF THE INVENTION

Figure 1:
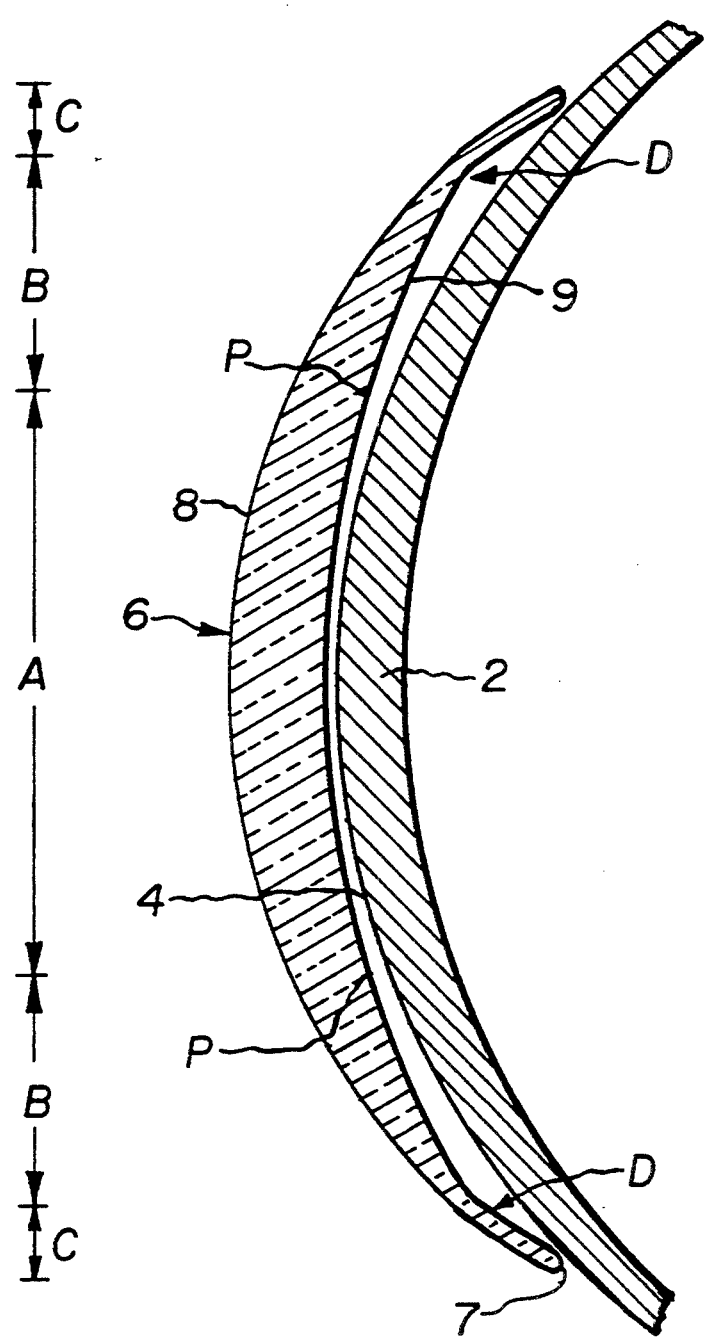
FIG. 1 is an enlarged cross section schematically showing the fit between a cornea and the aspheric multifocal lens of this invention.

The aspheric curves forming the posterior surface of the lenses of this invention are constituted by portions of second-order surfaces of revolution other than spherical. Preferred non-spherical conic sections are ellipsoids, hyperboloids or paraboloids. Preferred conic sections to be used with the respective zones are as follows: the central zone is preferably an ellipsoid; the marginal zone or zones are preferably hyperboloids; the peripheral zone is preferably a hyperboloid; and the optional (but preferred) fillet curve is preferably an ellipse.

Referring to FIG. 1, there is seen a schematic cross sectional view of a cornea (2) with its surface (4) adjacent to the back surface of a lens (6). The lens (6) has an edge (7), a front surface (8) which is preferably spherical, and a back surface (9). The back surface has a central zone (A), a marginal zone (B), a peripheral zone (C), and a fillet curve (D).

For the illustrated embodiment, the central zone (A) is constituted by a segment of an ellipsoid of revolution, the generatrix of which is given by the equation:

$$Z = \frac{(C)(X^2)}{1 + \sqrt{(1 - (1 - K)C^2 X^2)}}$$

wherein Z is the saggital depth, X is the half diameter, C is $1/R_o$ (wherein $R_o$ is the base curve radius of the central zone of surface 9), and $K = -(e^2)$ (wherein e is the eccentricity of the ellipse).

The marginal zone (B) of the lens exemplified in FIG. 1 is constituted by a segment of a hyperboloid of revolution, the generatrix of which is generated by the equation:

$$Z = \frac{(C)(X^2)}{1 + \sqrt{(1 - (1 - K)C^2 X^2)}} + T$$

wherein Z and X are as defined above, C is $1/R_o$ (wherein $R_o$ is the peripheral radius of the marginal zone of surface 9), $K = -(e^2)$ (wherein e is the eccentricity of the marginal zone) and T is the hyperbolic offset.

The peripheral zone (C) of this lens exemplified in FIG. 1 is also constituted by a segment of a hyperboloid of revolution, the generatrix of which is given by the equation:

$$Z = \frac{(C)(X^2)}{1 + \sqrt{(1-(1-K)C^2X^2)}} + T$$

wherein are as defined above, C is 1/Ro (wherein Ro is the peripheral radius of the peripheral zone of surface 9), $K = -(e^2)$ (wherein e is the eccentricity of the peripheral zone) and T is the hyperbolic offset.

The "fillet" curve (D) (as used herein) is a curve placed at the points where the peripheral and outermost marginal zones come together. The fillet curve is preferably included to provide a lens with a smoother transition between the marginal and peripheral zones. The fillet curve (D) is preferably constituted by a segment of an ellipsoid of revolution, the generatrix of which is given by the equation:

$$Z = \frac{(C)(X^2)}{1 + \sqrt{1 - (1-K)C^2X^2}}$$

wherein Z is the saggital depth, X is the half diameter, C is 1/Ro (wherein Ro is the central radius of the surface D), and $K = -(e^2)$ (wherein e is the eccentricity of the ellipse). This surface of revolution for the fillet curve is selected so that it provides the desired smooth transition between the non-tangential surfaces, outermost marginal zone (B) and peripheral zone (C).

It is a characteristic feature of the lens according to this invention that the transition from the central zone (A) to the marginal zone (B) is tangential; point (P) where the central zone ends and the marginal zone begins lies on a tangent common to the curves of both zones.

It is also a characteristic feature of the lens of this invention that the axial edge lift of the central and marginal zones (A), (B) of the lens increases towards the edge of the lens. The axial edge lift of peripheral zone (C) decreases toward the edge of the lens. "Axial edge lift" (as used herein) is the distance between a point on the back surface of a lens at a specific diameter and a vertex sphere, measured parallel to the lens axis, the vertex sphere being a theoretical sphere having a radius of curvature equal to that at the direct geometric center of the lens.

As depicted in the illustrated embodiment, central zone (A) is preferably generated by an ellipse, marginal zone (B) is preferably generated by an hyperbola, peripheral zone (C) is preferably generated by an hyperbola, and fillet curve (D) is generated by an ellipse. However, any combination of ellipses, hyperbolas, and parabolas may be used to create each zone and the fillet curve. In addition, the marginal and peripheral zones may be comprised of more than one aspheric curve. As will be apparent to those skilled in the art, multiple marginal and peripheral zones may be combined together to form the total periphery of the lens, provided that the transitions between the marginal zones are tangential.

When fitting the lens of this invention, the trial lens method with fluorescein assessment should be employed. The base curve radius of the first trial lens is chosen by measuring the corneal curvature and identifying the Flat K and the amount of corneal astigmatism. Preferably, the lenses of this invention may be provided with a base curve radius (Ro) from about 6.30 mm to 8.30 mm, generally in incremental steps of 0.05 mm or 0.10 mm. Outside diameters preferably range from about 8.2 mm to 10.5 mm, with the central zone (A) having a diameter preferably greater than the pupil diameter and less than 8.0.

A representative lens having a base curve radius of 7.3 mm and an outer diameter of 9.6 mm may be provided with the following posterior zones: central zone (A) having a diameter of 7.0 mm, the base curve radius of 7.3 mm and constituted by a segment of an ellipsoid having an eccentricity of 0.75; marginal zone (B) having a diameter of 9.0 mm, a peripheral radius of 5.7 mm and constituted by a segment of a hyperboloid having an eccentricity of 1.5 and an offset of −0.11; a peripheral zone having a peripheral radius of 6.6 mm and constituted by a segment of a hyperboloid having an eccentricity of 0.083 and an offset of −0.34. Lenses with other curves can be provided by one skilled in the art.

The invention is not limited to the details of the illustrative embodiments. This invention may be embodied in other specific forms without departing from the essential attributes thereof. The present embodiments are therefore to be considered as illustrative and not restrictive.

I claim:

1. A contact lens comprising an edge and a back surface having a central zone, a marginal zone, and a peripheral zone, each of the zones being constituted by portions of second-order surfaces of revolution other than spherical, wherein the axial edge lift of the central and marginal zones increase toward the edge of the lens, the transition from the central to the marginal zone is tangential, and the axial edge lift of the peripheral zone decreases toward the edge of the lens.

2. The lens of claim 1 wherein the transition between the marginal zone and the peripheral zone is smoothed by an aspheric fillet curve, the fillet curve being a portion of a surface of revolution, the generatrix of which is a conic section other than a circle.

3. The lens of claim 1 wherein said central zone is an ellipsoid surface of revolution.

4. The lens of claim 1 wherein at least one marginal zone is a hyperboloid surface of revolution.

5. The lens of claim 1 wherein said peripheral zone is a hyperboloid surface of revolution.

6. The lens of claim 2 wherein said fillet curve is an ellipsoid surface of revolution.

7. The lens of claim 1 wherein the back surface comprises a central zone which is an ellipsoid surface of revolution, a marginal zone which is a hyperboloid surface of revolution, and a peripheral zone which is a hyperboloid surface of revolution.

8. The lens of claim 7 wherein the transition between the marginal zone and the peripheral zone is smoothed by an aspheric fillet curve, the fillet curve being a portion of a surface of revolution, the generatrix of which is a conic section other than a circle.

9. In a method for making contact lenses the improvement of which comprises putting onto a back surface of a contact lens a central zone, at least one marginal zone, a peripheral zone, and a fillet curve, said central zone, said marginal zone, said peripheral zone and said fillet curve each being constituted by a portion of a surface of revolution, the generatrix of which is a conic section other than a circle.

* * * * *